3,108,993
POLYMERIZATION OF VINYL CHLORIDE
Donald L. Christman, Wilmington, Del., assignor to Hercules Powder Company, Wilmington, Del., a corporation of Delaware
No Drawing. Filed Oct. 24, 1956, Ser. No. 617,945
6 Claims. (Cl. 260—92.8)

This invention relates to a new process of polymerizing vinyl chloride and, more particularly, to a process of obtaining a crystalline poly(vinyl chloride) which exhibits a crystalline-type X-ray diffraction powder pattern.

It is well known that vinyl chloride may be polymerized in bulk, solution, suspension, or emulson polymerization systems with free radical-type catalysts, as for example, with hydrogen peroxide, acyl peroxides such as benzoyl peroxide, persulfates, peracetic acid, aliphatic azo initiators such as $\alpha,\alpha'$-azo-bis-isobutyronitrile, etc. In every case the polymer that is obtained is of the same type but of varying molecular weight. These poly(vinyl chlorides) are amorphous in character, and X-ray diffraction patterns of the poly(vinyl chlorides) produced by these methods are diffuse, demonstrating that there are structural features in the polymer which are unfavorable to crystallization. In fact, the polymers are so very poorly crystalline that the X-ray diffraction pattern even of a drawn fiber shows only a very few diffuse spots and the only definite information that has been obtained from the pattern is that there is a chain repeat distance of about 5.1 A. There are too few crystal reflection to permit even tentative unit cell dimensions to be considered.

Now, in accordance with this invention, it has been discovered that a highly crystalline poyl(vinyl chloride) may be produced by contacting vinyl chloride with a catalyst formed by mixing a compound of a metal of group I–B of the periodic table with an organometallic compound of a metal of groups I–A, II–A or III–A of the periodic table. The poly(vinyl chloride) so obtained is a highly crystalline polymer that exhibits a very definite X-ray diffraction powder pattern. The crystal lattice spacings and relative intensities of the diffraction lines of a typical poly(vinyl chloride) produced in accordance with this invention are as follows.

| Crystal lattice spacings $d$: | Approximate relative intensities (on a scale of 10) |
|---|---|
| 5.3 A | 8 |
| 4.75 A | 10 |
| 3.60 A | 6 broad |
| 2.90 A | 2 |
| 2.58 A | 1 |
| 2.29 A | 2 |

In the polymerization of vinyl chloride in accordance with this invention using as the catalyst for the polymerization a combination of a compound of a group I–B metal of the periodic table with an organometallic compound, any inorganic or organic salt or complex of the metals of group I–B may be used. Thus, any compound of copper, silver, or gold may be used, as for example, cupric chloride, cuprous chloride, cupric bromide, cuprous bromide, cupric sulfate, cupric acetate, cuprous acetate, cuprous oxide, cuprous carbonate, cupric acetylacetonate, silver chloride, silver acetylacetonate, gold trichloride, gold monochloride, etc.

In carrying out the polymerization of the vinyl chloride with the combination of a group I–B metal compound with an organometallic compound, it is usually preferable to utilize the group I–B metal compound in a finely divided form such as may be obtained by grinding the solid compounds by any desired means, as for example, in a pebble mill, ball mill, etc.

The organometallic compound that is reacted with the group I–B metal compound may be any organo compound of an alkali metal, alkaline earth metal, earth metal, or rare earth metal, as for example, alkali metal alkyls or aryls such as butyllithium, amylsodium, phenylsodium, etc., dimethylmagnesium, diethylmagnesium, diphenylmagnesium, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known tas aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc.

Any mode of introducing the two catalyst components into the polymerization system may be utilized. Usually the organometallic compound and the group I–B metal compound are added in the form of solutions or suspensions in inert organic diluents. Either one may be introduced into the system followed by the second or they may be introduced simultaneously, or added in increments or continuously throughout the polymerization or the two catalyst components may be mixed and then added as a preformed catalyst to the polymerization system. The amount of the two catalyst components may be varied over a wide range, but in general, the molar ratio of organometallic compound to the group I–B metal compound will be within the range of from about 0.1:1 to about 20:1 and preferably within the range of about 0.3:1 to about 10:1.

The polymerization of vinyl chloride in accordance with this invention may be carried out in a wide variety of ways. The process may be a batch or continuous operation and may be carried out with or without the use of an inert organic diluent as the reaction medium. Any inert liquid organic diluent may be used, as for example, aliphatic hydrocarbons such as hexane, heptane, etc., cycloaliphatic hydrocarbons such as cyclohexane, etc., or any mixture of such hydrocarbons, halogenated hydrocarbons such as ethyl chloride, methyl chloride, methylene chloride, ethylene chloride, carbon tetrachloride, chlorobenzene, and aliphatic ethers, cycloaliphatic ethers, aromatic ethers, and cyclic ethers, as for example, diethyl ether, dioxane, tetrahydrofuran, etc. Of particular value for carrying out the polymerization are the ethers such as diethyl ether and tetrahydrofuran or halogenated aliphatic hydrocarbons such as methylene chloride and ethylene chloride.

The selection of the temperature and pressure used for the polymerization process will obviously depend upon the activity of the catalyst system being used, the diluent used, the degree of polymerization desired, etc. In general, the polymerization will be carried out at room temperature or slightly above, but any temperature within the range of from about $-50°$ C. to about $150°$ C., and preferably from about $-20°$ C. to about $100°$ C., may be used. In the same way, while atmospheric pressure or a pressure of only a few pounds may be used, the polymerization may be carried out under a wide range of pressures, as for example, from a partial vacuum to about 1000 pounds and preferably from about atmospheric to about 500 pounds pressure. Higher pressures may, of course, be used but generally do not appreciably alter the course of the polymerization.

In accordance with this invention, using a combination of group I–B metal compound and organometallic compound, it is frequently desirable to incorporate in the reaction mixture a complexing agent for the organometallic compound used for the polymerization. Just what may be the function of the complexing agent is not completely understood, but it is believed that it forms a complex with the organometallic compound to prevent any undesirable side reactions which might otherwise take place between the organometallic compound and the monomer or polymer. Any compound that will form a loose type of complex (possibly functioning as an electron donor) with the organometallic compound may be used, as for example, ethers, tertiary amines, esters, ketones, nitroaromatics, etc., provided it does not destroy an excessive amount of the organometallic compound present. Exemplary of the complexing agents that have been found to be particularly effective are ethers such as diethyl ether, tetrahydrofuran, etc., triethylamine and ethyl acetate. Any amount of the complexing agent may be used, but preferably an amount is used such that at least about one mole of it per mole of organometallic compound present in the polymerization system is used. It may be added with the organometallic compound or in some cases with the group I–B metal compound, or it may be added to the solution of monomer. In many cases it may be desirable to use the complexing agent, as for example, diethyl ether and tetrahydrofuran, as the major component of the inert organic diluent being used for the polymerization process.

The periodic chart used in this specification and appended claims for designating the groups and subgroups of the periodic table is that given in the "Handbook of Chemistry and Physics," published by Chemical Rubber Publishing Company, Cleveland, Ohio, on pages 392–3 of the 36th edition.

The following examples will illustrate the process of polymerizing vinyl chloride in accordance with this invention and some of the many modifications that can be made in this process. As may be seen from these examples, it is possible to select conditions to prepare a polymer of various desired molecular weights. The relative molecular weight of the polymers produced in these examples is shown by the specific viscosity given for each, determined on a solution of the polymer in cyclohexanone at 135° C. All parts and percentages are by weight unless otherwise specified.

Examples 1–16

In each of these examples a polymerization vessel, freed from air, was charged with 10 parts of vinyl chloride, the diluent, and the organometallic compound suspended or dissolved in n-heptane and complexed with a molar amount of tetrahydrofuran except in Example 5 where the diethylmagnesium used was complexed with a half-molar amount of dioxane and in Example 15 where no complexing agent was used. After equilibrating at 30° C., the group I–B metal compound was added. In Examples 1–15 the copper compounds were ball-milled several hours in n-heptane and added as a suspension. In Example 16 the silver chloride was ball-milled and added as a dry powder. The group I–B compound and amount thereof, the organometallic compound and amount thereof, and the molar ratio of the two catalyst components and the diluent used are set forth in the following table. After about 20 hours at 30° C., the polymerization was stopped by adding 1.6 parts of anhydrous ethanol. The reaction mixture was then poured into 120 parts of anhydrous ethanol. The precipitated polymer was separated by filtration, dried for 16 hours under vacuum at room temperature, and then purified by dissolving it in tetrahydrofuran, filtering the solution and reprecipitating it in methanol. The specific viscosity of the polymer obtained in each case is set forth in the following table. Each of these polymers was shown to be crystalline by its X-ray diffraction powder pattern.

| Ex. | Group I–B Metal Compound | Parts | Organometallic Compound | Parts | Molar Ratio of Organometallic to Group I–B Metal Compound | Diluent | Specific Viscosity of Polymer (in cyclohexanone at 135° C.) |
|---|---|---|---|---|---|---|---|
| 1 | CuA$_2$[1] | 0.26 | Al(i-C$_4$H$_9$)$_3$ | 0.40 | 2:1 | CH$_2$Cl$_2$ | 0.37 |
| 2 | CuA$_2$[1] | 0.26 | Al(i-C$_4$H$_9$)$_3$ | 0.40 | 2:1 | CH$_2$Cl$_2$ | 0.44 |
| 3 | CuA$_2$[1] | 0.26 | Al(C$_2$H$_5$)$_3$ | 0.23 | 2:1 | CH$_2$Cl$_2$ | 0.24 |
| 4 | CuA$_2$[1] | 0.26 | Al(C$_2$H$_5$)$_3$ | 0.46 | 4:1 | CH$_2$Cl$_2$ | 0.18 |
| 5 | CuA$_2$[1] | 0.26 | Mg(C$_2$H$_5$)$_2$ | 0.25 | 3:1 | CH$_2$Cl$_2$ | 0.33 |
| 6 | CuCl$_2$ | 0.13 | Al(i-C$_4$H$_9$)$_3$ | 0.40 | 2:1 | CH$_2$Cl$_2$ | 0.46 |
| 7 | CuCl$_2$ | 0.13 | Al(C$_2$H$_5$)$_3$ | 0.23 | 2:1 | CH$_2$Cl$_2$ | 0.50 |
| 8 | CuCl$_2$ | 0.13 | Al(C$_2$H$_5$)$_3$ | 0.46 | 4:1 | CH$_2$Cl$_2$ | 0.38 |
| 9 | Cu$_2$Cl$_2$ | 0.20 | Al(i-C$_4$H$_9$)$_3$ | 0.40 | 2:1 | CH$_2$Cl$_2$ | 0.41 |
| 10 | Cu$_2$Cl$_2$ | 0.20 | Al(C$_2$H$_5$)$_3$ | 0.23 | 2:1 | CH$_2$Cl$_2$ | 0.51 |
| 11 | Cu$_2$Cl$_2$ | 0.20 | Al(C$_2$H$_5$)$_3$ | 0.46 | 4:1 | CH$_2$Cl$_2$ | 0.37 |
| 12 | Cu$_2$Cl$_2$ | 0.20 | Al(C$_2$H$_5$)$_3$ | 0.46 | 4:1 | n-heptane | 0.33 |
| 13 | Cu$_2$Cl$_2$ | 0.20 | Al(C$_2$H$_5$)$_3$ | 0.46 | 4:1 | THF | 0.22 |
| 14 | Cu$_2$Cl$_2$ | 0.20 | Al(C$_2$H$_5$)$_3$ | 0.46 | 4:1 | CCl$_4$ | 0.19 |
| 15 | Cu$_2$Cl$_2$ | 0.20 | LiC$_4$H$_9$ | 0.32 | 5:1 | CH$_2$Cl$_2$ | 0.23 |
| 16 | AgCl | 0.14 | Al(C$_2$H$_5$)$_3$ | 0.46 | 4:1 | CH$_2$Cl$_2$ | 0.70 |

[1] A represents the acetylacetonate.

What I claim and desire to protect by Letters Patent is:

1. The process of preparing poly(vinyl chloride) which comprises homopolymerizing vinyl chloride with a catalyst consisting essentially of that formed by mixing the components of one of the combinations selected from the group consisting of
   (a) copper acetylacetonate with an aluminum trialkyl
   (b) a copper chloride with an aluminum trialkyl
   (c) copper acetylacetonate with diethylmagnesium
   (d) a copper chloride with an alkali metal alkyl
   (e) silver chloride with an alkali metal alkyl,
said components being mixed in a molar ratio of from about 0.1:1 to about 20:1.

2. The process of preparing poly(vinyl chloride) which comprises homopolymerizing vinyl chloride with a catalyst consisting essentially of that formed by mixing copper acetylacetonate with an aluminum trialkyl in a molar ratio of from about 0.1:1 to about 20:1.

3. The process of preparing poly(vinyl chloride) which comprises homopolymerizing vinyl chloride with a catalyst consisting essentially of that formed by mixing a copper chloride with an aluminum trialkyl in a molar ratio of from about 0.1:1 to about 20:1.

4. The process of preparing poly(vinyl chloride) which comprises homopolymerizing vinyl chloride with a catalyst consisting essentially of that formed by mixing a copper acetylacetonate with diethyl magnesium in a molar ratio of from about 0.1:1 to about 20:1.

5. The process of preparing poly(vinyl chloride) which comprises homopolymerizing vinyl chloride with a catalyst consisting essentially of that formed by mixing a copper chloride with an alkali methyl alkyl in a molar ratio of from about 0.1:1 to about 20:1.

6. The process of preparing poly(vinyl chloride) which comprises homopolymerizing vinyl chloride with a catalyst consisting essentially of that formed by mixing silver chloride with an alkali metal alkyl in a molar ratio of from about 0.1:1 to about 20:1.

References Cited in the file of this patent

UNITED STATES PATENTS

| | | |
|---|---|---|
| 2,344,785 | Owens et al. | Mar. 21, 1944 |
| 2,475,520 | Roedel et al. | July 5, 1949 |
| 2,771,457 | Barnes et al. | Nov. 20, 1956 |
| 2,827,447 | Nowlen | Mar. 18, 1958 |
| 2,842,474 | Pratt | July 8, 1958 |